United States Patent
Teague et al.

(10) Patent No.: US 7,190,750 B2
(45) Date of Patent: Mar. 13, 2007

(54) RAKE RECEIVER FOR TRACKING CLOSELY SPACED MULTIPATH

(75) Inventors: Edward Harrison Teague, San Carlos, CA (US); Messay Amerga, San Diego, CA (US); Jeremy Lin, Sunnyvale, CA (US); Da-shan Shiu, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 743 days.

(21) Appl. No.: 10/086,574

(22) Filed: Feb. 28, 2002

(65) Prior Publication Data

US 2003/0161390 A1    Aug. 28, 2003

(51) Int. Cl.
H04B 7/10    (2006.01)
(52) U.S. Cl. ...................................... 375/347
(58) Field of Classification Search .............. 375/349, 375/347, 144, 148, 267; 455/500, 504, 506, 455/132, 137
See application file for complete search history.

(56) References Cited

U.S. PATENT DOCUMENTS 5,978,423 A * 11/1999 Farjh ........................ 375/347
6,078,611 A *  6/2000 La Rosa et al. ............ 375/147
6,314,130 B1 * 11/2001 Smolyar et al. ............ 375/150
6,345,078 B1 *  2/2002 Basso ........................ 375/349
6,728,303 B2 *  4/2004 Sendonaris ................. 375/148

FOREIGN PATENT DOCUMENTS

WO        9728608       8/1997

OTHER PUBLICATIONS

Schulz-Rittich. P. et al. Low Complexity Adaptive Code Tracking with Improved Multipath Resolution for DS-CDMA Communications over Fading Channels, IEEE, Sep. 6-8, 2000, pp. 30-34.

* cited by examiner

Primary Examiner—Kevin Kim
(74) Attorney, Agent, or Firm—Philip R. Wadsworth; Charles D. Brown; Timothy F Loomis

(57) ABSTRACT

Techniques for tracking closely spaced multipath and preventing finger merge without monitoring relative positions between each of a plurality of fingers are disclosed. In one aspect, motion limits are determined for each finger. Time-tracking commands that would move the position of a finger outside its respective motion limits are suppressed. In another aspect, motion limits are updated dynamically, the motion limits of each finger determined in accordance with the motion limits of fingers adjacent to it. Various other aspects are also presented. These aspects have the benefit of preventing finger merge, which allows the allocation of multiple fingers to closely spaced multipath, thus increasing performance and system capacity, and mitigating misallocation of system resources.

7 Claims, 7 Drawing Sheets

RAKE RECEIVER FOR TRACKING CLOSELY SPACED MULTIPATH

BACKGROUND

Field

The present invention relates generally to communications, and more specifically to a novel and improved method and apparatus for tracking closely spaced multipath.

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

In CDMA systems, mobile stations often differentiate various base stations based on their respective scrambling codes. A base station transmits a signal, which may reflect off of or be attenuated by various obstacles and surrounding objects. As a result, various copies of the transmitted signal, at various power levels, are received at the mobile station with various time offsets introduced. The plurality of signals received from a base station is often referred to as multipath. Rake receivers are commonly deployed to demodulate multipath signals, with each of a plurality of fingers assigned to track and demodulate one component of the multipath signal. The output of the fingers is then combined and further demodulated and decoded. The fingers are deployed so as to receive and process as much of the received energy as practicable.

The scrambling codes comprise a sequence of values referred to as chips, with each chip transmitted for a chip time. The channel, defined by the various objects and obstacles encountered by signals transmitted by the base station to the mobile station, will introduce various attenuations and delays, which may be spread over a varying period of time, sometimes referred to as a delay spread. In a low rate or narrower band CDMA system, the delay spread may be less than a chip time. In such a case, the various multipath components may not be distinguishable, and one finger can be assigned to receive and demodulate the energy in the multipath components. As the chip rate, or bandwidth, increases in relation to the delay spread of the channel, the multipath components become spread into distinguishable time offsets from each other, each of which can be tracked by a finger in a Rake receiver. For example, in a WCDMA system, the delay spread in a channel may be significant, perhaps as many as 20 chips. Even a more common delay spread of approximately 10 chips can have significant power spread over 4 chips.

The overall performance of the system, including capacity, voice quality, data transmission rates and throughput, is dependant upon mobile stations capturing a significant portion of the received energy. Assigning only a single finger to one of the multipath components may leave a relatively large portion of the received signal energy from a base station unused. Instead, a plurality of fingers can be assigned to components of the multipath, perhaps spaced closely together in terms of relative time offset, so as to capture more energy.

In general, fingers in a Rake receiver are configured to time-track the signal component to which they are assigned. Thus, as the time offset in a multipath component advances or retards with respect to a reference offset, the finger advances or retards the reference offset to track it. Such multipath offset shifting may be due to movement of the mobile station or the obstacles creating the channel. It is possible for the fingers assigned to closely spaced multipath to merge as the multipath components move, or when the energy in a neighboring offset is greater than the offset being tracked. When two or more fingers have merged, they will be tracking the same offset, and thus the output of each of the merged fingers will be identical.

Finger merge has negative implications for system performance for a variety of reasons. The assignment of more than one finger to a single offset is a waste of system resources; the additional finger or fingers would be better deployed receiving additional energy from another multipath component or another base station. Also, the combined power of the various fingers is often used to control various system parameters, such as power control; without accounting for finger merge, a system may over-estimate the received power from the duplication of energy in the combiner, and thus over-compensate by lowering transmit power below a threshold required for adequate communication. Moreover, combining the output of merged fingers with the output of non-merged fingers weights both the signal and noise of the merged finger output too heavily in relation to the non-merged finger output, which may result in increased bit error rate.

Previous solutions to the problem include attempting to identify finger merge after it has occurred and compensating for it a posteriori. In the alternative, hardware solutions have been developed which monitor the respective offsets between each pairing of a plurality of fingers and arbitrate time-tracking commands that would lead to finger merge between any two fingers in a pair. Post-merge detection may reduce, but does not eliminate, the problem. Special purpose hardware solutions, which monitor the relative positions between each pair of fingers, can be complex and costly, and the complexity expands dramatically as more fingers are supported. It may also be desirable to prevent finger merge in existing designs with a firmware upgrade—in such a case the special purpose hardware may not be available.

There is therefore a need in the art for a Rake receiver for tracking closely spaced multipath that prevents finger merge without monitoring relative positions between each of a plurality of fingers.

SUMMARY

Embodiments disclosed herein address the need for a Rake receiver for tracking closely spaced multipath that prevents finger merge without monitoring relative positions between each of a plurality of fingers. In one aspect, motion limits are determined for each finger. Time-tracking commands that would move the position of a finger outside its respective motion limits are suppressed. In another aspect, motion limits are updated dynamically, the motion limits of each finger determined in accordance with the motion limits of fingers adjacent to it. Various other aspects are also presented. These aspects have the benefit of preventing finger merge, which allows the allocation of multiple fingers to closely spaced multipath, thus increasing performance and system capacity, and mitigating misallocation of system resources.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
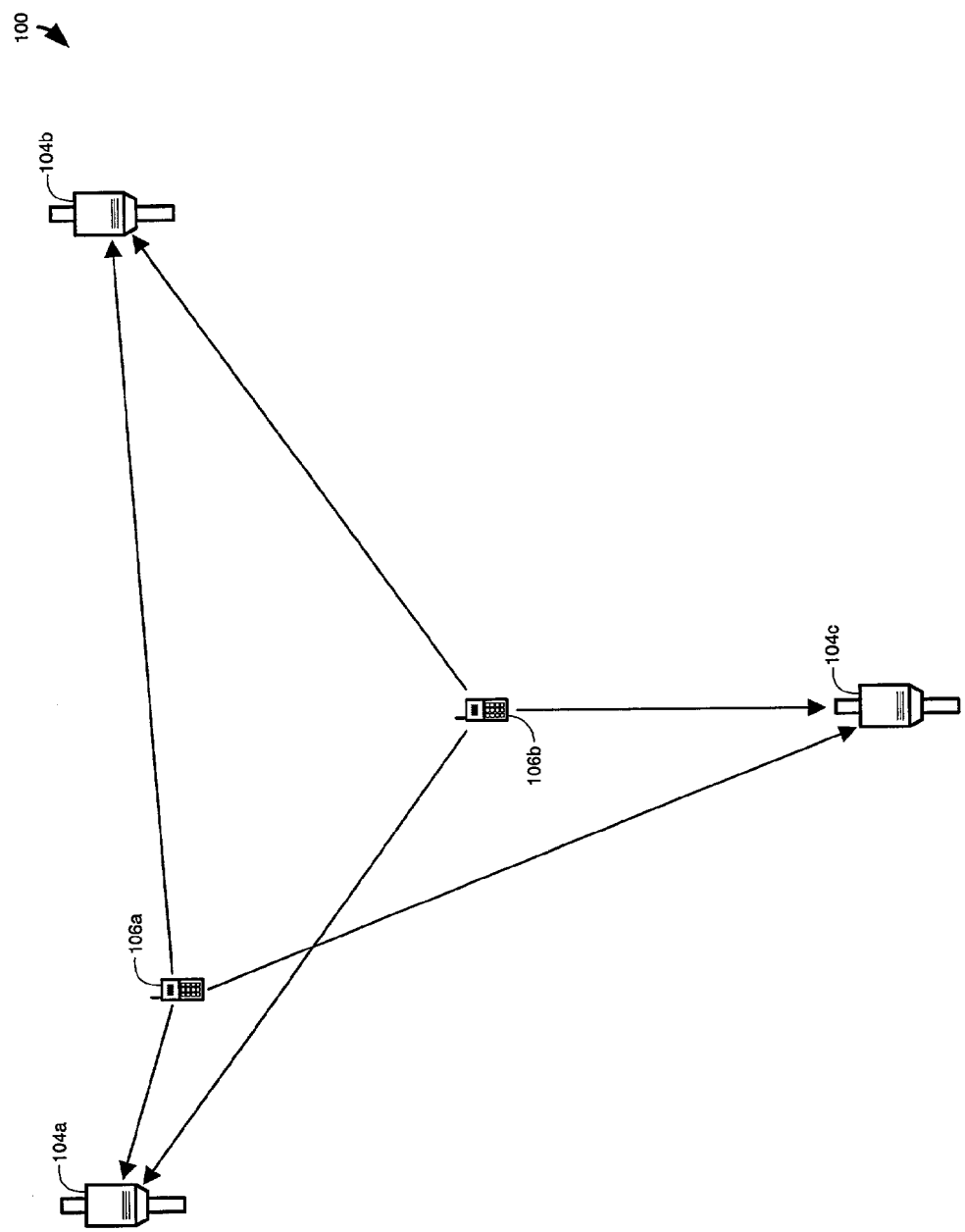
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station. The communication links shown between base stations 104 and mobile stations 106 may include direct paths as well as paths introduced due to reflections off various obstacles (not shown). In addition, obstacles may block the direct path and a mobile station 106 may communicate with a base station using only reflected signals. The combination of direct and reflected communication signals transmitted between a base station and a mobile station are referred to as a multipath signal, with the multipath signal comprised of various multipath components. The multipath components arrive at the mobile station or base station, on the forward or reverse link, respectively, with various time, phase and amplitude adjustments introduced.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
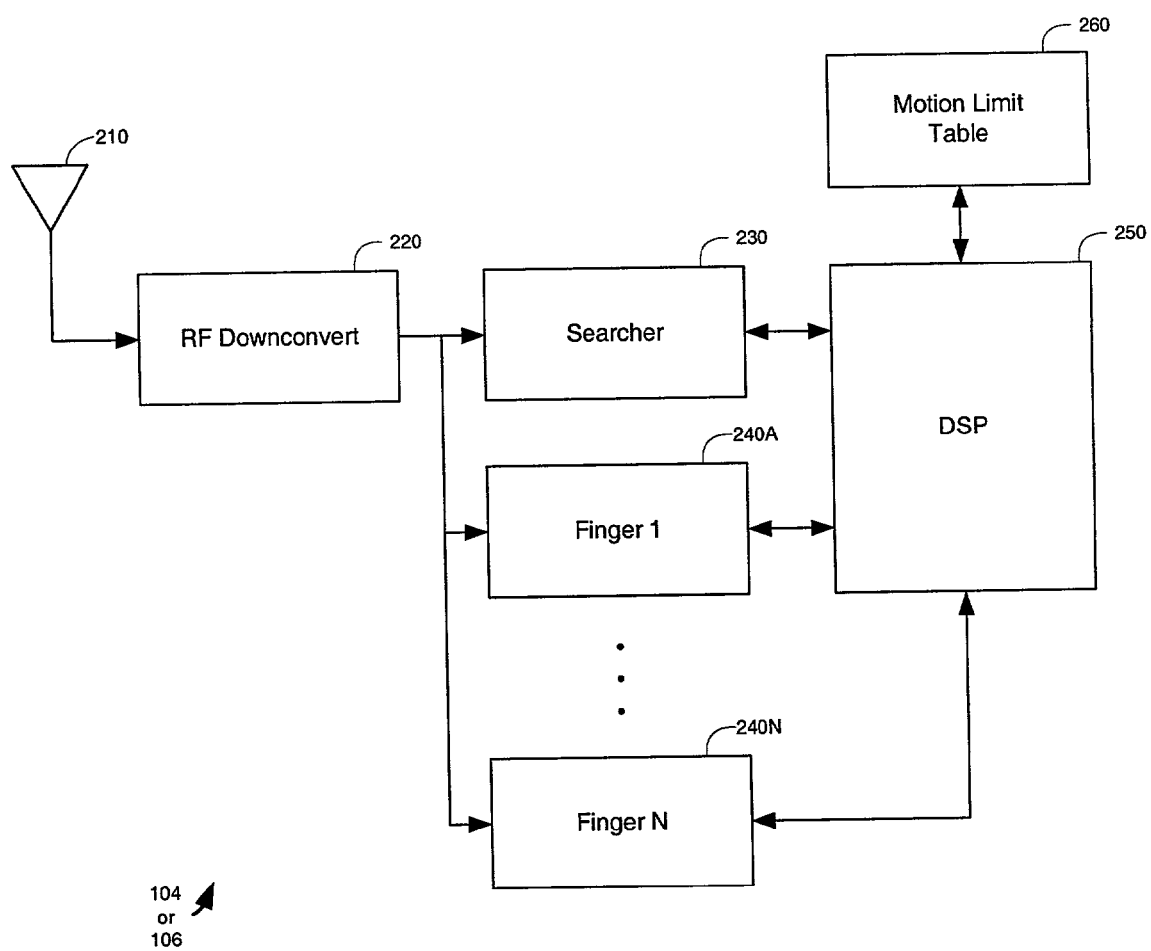
FIG. 2 depicts a portion of a Rake receiver of a base station or mobile station equipped for motion limiting a plurality of fingers.

FIG. 2 depicts an embodiment of a communication device that can be configured as a base station 104 or a mobile station 106. For clarity of discussion, the communication device of FIG. 2 will be referred to hereinafter as a mobile station. Those of skill in the art will recognize that the principles described apply to any communication station, including base stations, mobile station, fixed wireless applications, and the like. Various embodiments, examples of which are detailed below, may call for only a subset of the components shown in FIG. 2 in either a base station 104 or a mobile station 106.

Signals are received at antenna 210 and delivered for conversion from radio frequency (RF) to baseband, amplification, filtering, demodulation, decoding, and the like in RF downconvert block 220, techniques for which are known in the art. Searcher 230 can be configured to detect scrambling codes in the baseband signals. Some systems, such as IS-95 and cdma2000 systems, use a common scrambling code for all the base stations, with a unique offset in the code for each base station used to differentiate them. Other systems, such as W-CDMA systems, use unique scrambling codes to differentiate the various base stations. Searcher 230 may comprise a single searcher, or a plurality of search elements, or a single element shared for producing a plurality of search results. The search results are delivered to digital signal processor (DSP) 250. In alternate embodiments, DSP 250 may be any general-purpose processor. Those of skill in the art will recognize that the methods and functions described herein with respect to DSP 250 can also be performed using special purpose hardware, or a general-purpose processor, or a combination of both. DSP 250 will commonly contain, or be connected with, a memory for storing instructions to carry out the various tasks and processes described herein (memory not shown).

In one embodiment, the search results are a list of codes, offsets and energy values corresponding to energy peaks, which may be sorted in the searcher 230. Other embodiments may utilize DSP 250 for part of the search process, including partial accumulation, peak detection, and sorting. For systems using a common scrambling code, naturally, the code need not be specified in the search results, as the offset/energy value pairs will be sufficient. Any search method or apparatus can be deployed within the scope of the present invention.

DSP 250 uses the search results to perform finger assignment. A communication device, such as mobile station 106, may be deployed with a plurality of fingers 240A–240N, labeled Finger 1 through Finger N in FIG. 2. The fingers may be discrete hardware components, or processes in a chip-rate processor, or a combination of both. During finger assignment, the various fingers are allocated to demodulate incoming signals with a particular scrambling code at a certain offset. One method for determining which codes and/or offsets to allocate is to assign those identified by the searcher 230 with the greatest energy. When in soft handoff, the fingers can be assigned to demodulate signals from more than one base station. As described above, a plurality of fingers can also be assigned to track closely spaced multipath from a single base station.

Finger 1 through finger N, 240A–240N, respectively, may perform the chip-rate processing of the incoming signals at the allocated offsets, returning pilot and data symbols to DSP 250 for symbol rate demodulation. The demodulated symbols may be further combined, de-interleaved, decoded, etc., using techniques well known in the art (details not shown). An alternate embodiment may deploy special purpose hardware in conjunction with or in lieu of DSP 250 for symbol rate processing.

Following finger assignment, it is common in Rake receivers for each finger to independently track the signal they are demodulating. So, during demodulation, if the energy peak moves earlier or later in time from the offset initially assigned to a finger, the finger advances or retards to compensate. Advance or retard commands or signals are commonly generated to advance or retard a sequence generator used to produce a reference sequence for use in correlation with the incoming sequence. One method for time tracking is for the finger to generate symbol data at an early offset and a late offset with respect to the demodulated offset (or on-time offset). The energy in the early and late offsets can be compared to determine if the finger should be advanced or retarded. Time-tracking techniques are well known in the art. In the embodiment of FIG. 2, DSP 250 performs symbol rate processing, including early and late symbol processing, and issues advance and retard commands for each of the fingers 240A–240N.

In the exemplary embodiment, DSP 250 is connected to motion limit table 260. Motion limits are used to prevent two or more fingers, each tracking a multipath component from a common source, to merge and begin tracking the same offset. In various embodiments, described in further detail below, DSP 250 may suppress advance or retard commands for one or more fingers based on motion limits, stored in motion limit table 260, corresponding to the various fingers 240A–240N. DSP 250 may determine the appropriate motion limits for each finger during finger assignment, or at other times, depending on whether static or dynamic motion limits are deployed. Motion limits can be updated rapidly, or can remain relatively stable, depending on the desired responsiveness to changes in the channel and resources available to track them. Motion limit table 260 can be deployed in any storage medium. Motion limit table 260 may be contained in a memory within DSP 250, or within a memory external to DSP 250 (not shown).

Figure 3:
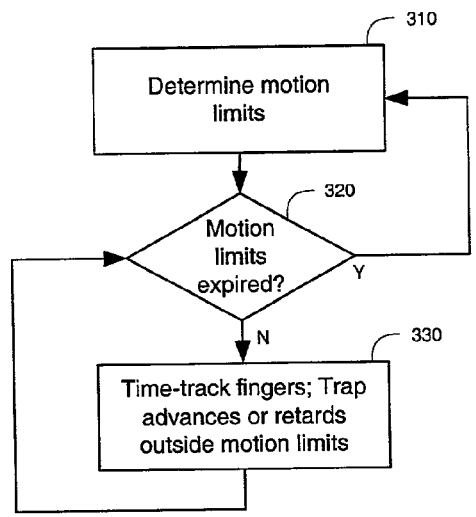
FIG. 3 shows a flow chart of an embodiment of a time-tracking method for a plurality of fingers employing motion limits.

FIG. 3 depicts a flowchart of a method for using motion limits to prevent finger merge. In block 310, motion limits for each finger are determined. In using what are referred to herein as "static" motion limits, the motion limits may be determined in concert with finger assignment. Various techniques for finger assignment are known in the art, and new methods are contemplated and can be used in association with motion limit determination. In decision block 320, if the motion limits determined in block 310 have expired, proceed back to block 310 to determine a new set. If not proceed to block 330 to time-track the fingers and trap advances or retards for any finger that would move the offset tracked by that finger outside the finger's motion limits.

This method prevents one finger from advancing or retarding too close to an adjacent finger. A channel may change due to relative motion between base and remote station, or motion of an object contributing to multipath within the channel. As this happens, the spacing of separately trackable multipath components may diminish, eventually disappearing, leaving only a single path to track. The motion limits will allow one finger to continue tracking the multipath component, since it will be within the allowable movement of one finger. However, a second finger will be prevented from tracking into an adjacent space (as will be described in further detail below). The energy collected by the finger unable to track the moving component will diminish, perhaps dropping below a threshold for inclusion in the combining procedure. Therefore, finger merge will be prevented, and the corresponding distortions in the combining and further demodulation, outlined above, will be mitigated.

Figure 4:
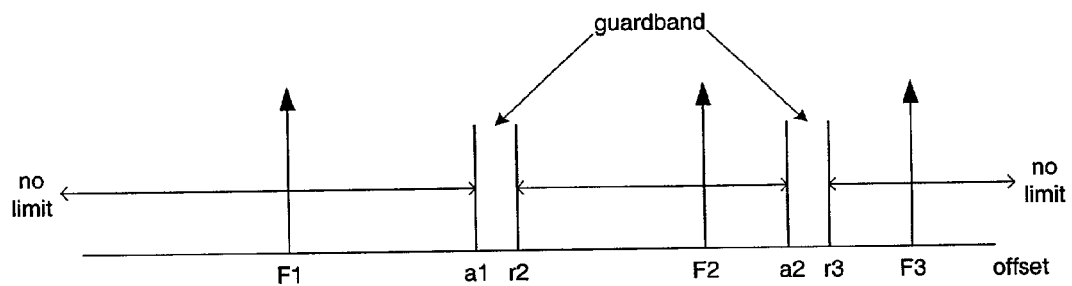
FIG. 4 is a graphical representation of the interrelationship between a plurality of fingers and their respective motion limits.

FIG. 4 shows a diagram depicting an exemplary relationship between the offsets of assigned fingers and their respective motion limits. In this example, three fingers are assigned to track multipath components from a common source. Arrows corresponding to offsets, labeled F1, F2 and F3, identify these fingers. Any number of fingers can be supported using this method. Each finger may have an advance motion limit and a retard motion limit. The retard and advance motion limits for finger F2 are labeled r2 and a2, respectively. In this figure, advances to a finger would move the offset identified by the corresponding arrow to the right, and retards would move the offset to the left. F3 is adjacent to F2, and is said to be ahead of F2. F2 is behind F3, and ahead of adjacent finger F1. In this example, neither F1 nor F3 have adjacent fingers other than F2 assigned to track multipath from the same source. Therefore, F3 has no advance limit, and F1 has no retard limit. Finger merge is not possible through retards of F1 or advances of F3. F1 has an advance limit, labeled a1, which is separated from adjacent retard limit r2 by a guardband. Similarly, F3 has a retard limit r3, which is separated from adjacent advance limit a2.

The guardband can be as small as the minimum increment with which fingers can advance and retard. In this embodiment, it is possible for F2 to retard as far as r2, and to advance as far as a2. Similarly, F1 can advance as far as a1, and F3 can retard as far as r3. Therefore, it is conceivable that two fingers could be tracking and demodulating incoming signals with offsets spaced apart by the amount in the specified guardband. In an exemplary embodiment, this minimum increment is ⅛ of a chip. Other values for the guardband can be contemplated. Greater values may be useful to restrict the spacing between adjacent fingers such that the noise tracked by the fingers is subject to an expected maximum correlation. It may be that allowing fingers to track within the minimum differentiated increment, such as ⅛ of a chip, may distort the output of the combiner due to noise correlation. Any value of guardband is within the scope of the present invention, and the guardband between various pairs of motion limits need not be identical.

In this example, the motion limits are determined such that two adjacent limits, an advance and retard, with the associated guardband, are centered between the offsets of two adjacent fingers. Thus, the advance limit and retard limit for F2 are not symmetric. Various other methods for determining motion limits, such as in block 310, are anticipated.

Static motion limits may be determined once for each finger assignment. Dynamic motion limits may be updated as often as every time a finger advances or retards, although they need not be updated so frequently. One advantage of the motion limit approach to preventing finger merge is that it does not require a relatively high level of processing power. Once a finger's motion limits are determined, it is not necessary to know the relative distance between any two fingers. It is sufficient to check one limit when an advance is called for, or another limit when a retard is called for. Thus the overhead for finger merge protection is proportional to the rate of time tracking, with a nominal amount of additional processing required. By contrast, a solution requiring knowledge of relative spacing of N fingers requires processing proportional to N(N−1) each time a finger requires an advance or retard. Special purpose hardware could be deployed to monitor the interrelationship between all the fingers, but the embodiments disclosed herein do not require this. Furthermore, in some instances, such as shown in FIG. 2, the procedures described herein can be deployed in existing mobile station or base station designs with a firmware upgrade, rather than deployment of special purpose hardware. Naturally, the principles of the present invention can be incorporated in special purpose hardware as well.

The advantage of dynamically updating motion limits is that it may be desirable to allow group wide shifts of closely spaced multipath to be tracked. It is the merging and crossing of multipath components that causes finger merge, not movements in offset that affect all the tracked multipath components. So, depending on the relative frequency of channel changes to finger assignment, it may be useful to re-determine motion limits at a higher frequency than that of finger assignment. Dynamically assigned motion limits are allowed to "breathe". So, as one finger advances, the adjacent fingers behind are given more room to advance, and as one finger retards, the adjacent fingers ahead are given more room to retard. In this manner, the motion limits can be used to prevent finger merge while allowing the group of fingers to continue tracking a cluster of multipath components as it varies over time.

In one embodiment deploying dynamic motion limits, a plurality of fingers is assigned to track one so-called "fat" path. The width of the path is allocated among the plurality of fingers, with the motion limits surrounding each finger abutted to those of the adjacent finger, with appropriate guardband. One finger, perhaps the one assigned to the center of the path, or alternately assigned to the peak of the path, is designated as the master. When time-tracking commands are sent to the master, the motion limits of the master may be updated. This may occur subsequent to each time-tracking command, or after a pre-determined number of commands, or some other period. The motion limits of the fingers surrounding the master will be advanced or retarded in accordance with advances or retards of the motion limits of the master finger. The details of this alternate embodiment are not shown. Those of skill in the art will recognize how to combine this technique with the various others described herein to produce alternate embodiments.

The expiration of motion limits, shown in decision block 320 of FIG. 3, may be concurrent with a new finger assignment procedure when static motion limits are deployed. A smaller period may be used when dynamic motion limits are deployed, although the limits need not be updated with every time-tracking command. When one or more motion limits are updated with each advance or retard command issued, the motion limits need not expire, since they are updated continuously. In such an embodiment, decision block 320 is not needed as such, since the motion limits will be updated continuously as the fingers time-track (until, perhaps, a new finger assignment procedure reallocates the fingers and re-distributes the motion limits).

The motion limits can be stored in a table, such as motion limit table 260. Table 1 is an example. The motion limits can be determined for each finger with respect to those fingers adjacent to it. It may be convenient to store the motion limits in order of ascending or descending offset. Or, the motion limits may be stored in a data structure related to other finger parameters, and the table values may thus be distributed among other memory locations.

TABLE 1

| ... |
|---|
| r1 |
| a1 |
| r2 |
| a2 |
| r3 |
| a3 |
| ... |

Note that, in the example given with respect to FIG. 4, there was no limit r1 or a3. In table 1, a special value may be stored in a motion limit entry to indicate that no limit exists, such as a null value.

In an alternative embodiment, motion limit table 260, or Table 1, can have a single entry for the limit between two adjacent fingers. Thus, factoring in guardband, if any, the motion limit table may include a1 but omit r2. Then, r2 can be calculated by adding the appropriate guardband to a1. Similarly, r2 could be stored in the motion limit table, omitting a1. Then, a1 can be calculated by subtracting the guardband from r2. (Details of this alternate embodiment are not shown.)

In yet another alternative embodiment, motion limit table 260 comprises a single entry corresponding to the advance limit of one finger and the retard limit of another. The table entry is a value indicating available room for the advance or retard, respectively. The entries can be initially calculated to be the separation between two adjacent fingers minus the guardband, or minimum allowable separation. If a finger moves, it moves toward one adjacent finger, and away from another. Thus, if a finger advances, the corresponding advance limit entry is decremented. Similarly, if a finger retards, the corresponding retard limit is decremented. In a similar fashion, increasing separation allows the appropriate table value to be incremented. Thus, if a finger advances, its corresponding retard limit table entry can be incremented. If it retards, its corresponding advance limit can be incremented.

Prior to issuance of an advance or retard, the appropriate motion limit table entry is accessed. When the table entry is zero, the desired advance or retard must be suppressed, because the adjacent fingers are at the minimum separation. When the table entry is greater than zero, the advance or retard is issued, and the appropriate motion limit table entries are modified, as just described.

To facilitate assignment and deassignment of fingers, a level of indirection can be added to access the motion limit table 260 just described. For example, a second table, consisting of a pair of pointers for each finger can be deployed. The pair of pointers includes an advance limit pointer and a retard limit pointer. Each pointer points to a table entry in motion limit table 260. Thus, the advance pointer for one finger points to the same entry as the retard pointer for an adjacent finger.

Figure 5:
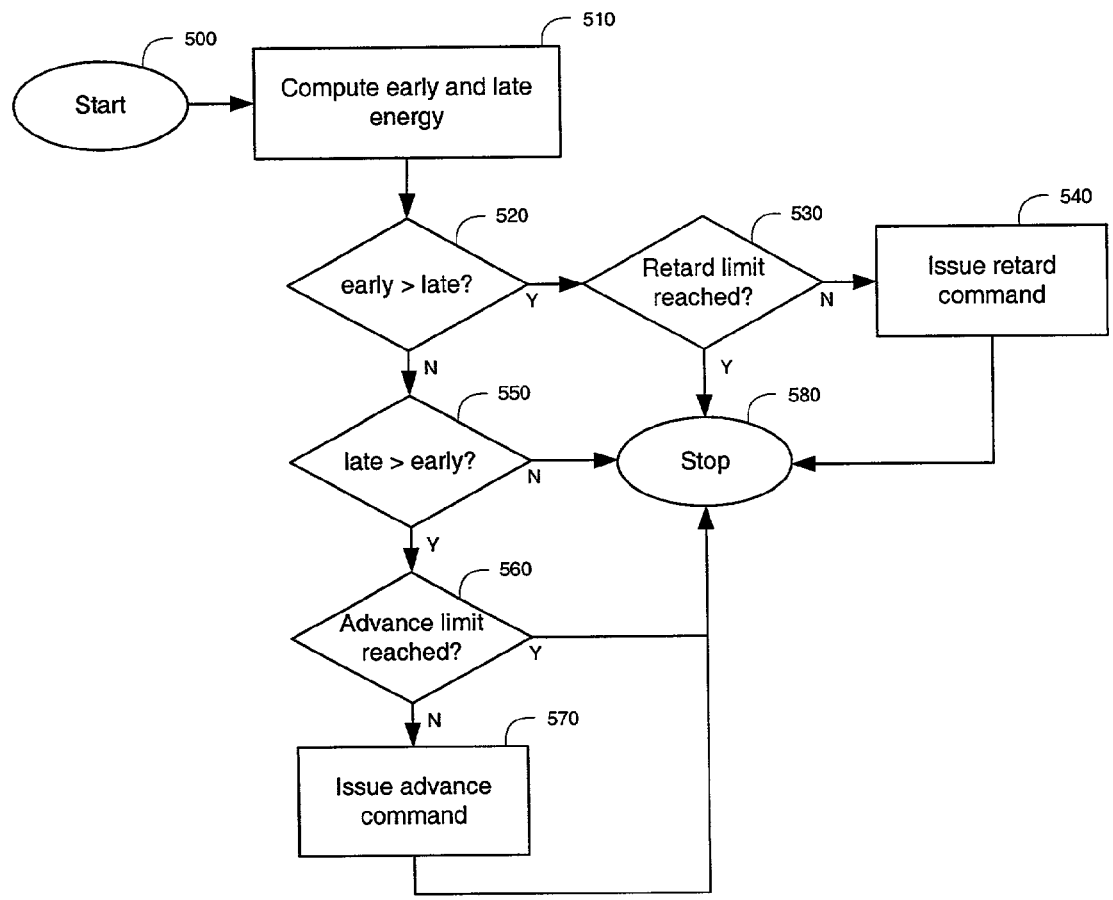
FIG. 5 depicts a more detailed flowchart of an embodiment of a method for time-tracking a plurality of fingers employing motion limits.

FIG. 5 is a flowchart of an exemplary procedure for time tracking within motion limits, such as the step described above in block 330. This procedure can be repeated for each active finger to perform step 330 for a plurality of fingers. The procedure begins in start block 500 and proceeds to block 510, where an early and late energy, with respect to the offset being tracked, is computed. Proceed to decision block 520.

In decision block 520, if the early energy is greater than the late energy, (perhaps with a difference exceeding a pre-determined threshold), signifying the offset is currently ahead of the optimal location for demodulation, proceed to decision block 530 to determine if the retard motion limit has been reached. If not, proceed to block 540 and issue a retard command, thus moving the offset tracked to an earlier offset, as appropriate. If the retard motion limit has been reached in decision block 530, the retard command will be suppressed. Proceed directly to stop block 580 to end the procedure without updating the tracked offset for the current finger.

In decision block 520, if the early energy is not greater than the late energy by the required threshold, proceed to decision block 550. In decision block 550, if the late energy exceeds the early energy (perhaps by a pre-determined threshold), signifying the offset is currently behind the optimal location for demodulation, proceed to decision block 560 to determine if the advance limit has been reached. If not, proceed to block 570 to issue an advance command to move the tracked offset forward. If the advance motion limit has been reached in decision block 560, the advance command will be suppressed. Proceed directly to stop block 580 to end the procedure without updating the tracked offset for the current finger.

Note that the current location of each finger may need to be stored to determine if an advance or retard would exceed an advance or retard motion limit, respectively. This would be useful if the motion limits were stored as offsets. In the alternative, a relative movement value could be stored, which would be incremented for an advance and decremented for a retard, for example. This method would be useful if the motion limits are stored as distances relative to the original offset of the finger.

Keeping track of the finger position may be useful in some embodiments deploying dynamic motion limit updating, examples of which are detailed further below. Procedures using the location of adjacent fingers in addition to motion limits may require somewhat more processing power. However, updating motion limits according to the location of adjacent fingers can be less complex than the N(N−1) order of complexity, described above, and the required processing can be scaled back further by increasing the time between dynamic updates.

Figure 6:
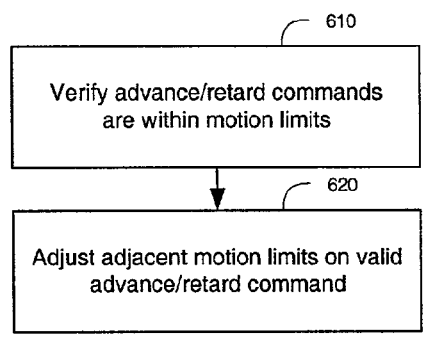
FIG. 6 depicts a flowchart of an embodiment of a method for dynamically updating motion limits.

FIG. 6 is a flowchart of a method for dynamic motion limit updating. In step 610, time tracking is performed for a finger, and any advance or retard commands are issued if the resultant move would leave the finger within motion limits associated with the finger. In step 620, subsequent to an advance or retard command for the current finger, the motion limits of adjacent fingers are adjusted. The original location of the motion limits can be initialized at finger assignment, for example. Then, as fingers advance and retard, the adjacent limits can be adjusted, allowing the motion limits to breathe, as described earlier, thus allowing a plurality of fingers tracking groups of closely spaced multipath to track offset changes of the group over time. The individual motion limits prevent finger merge due to merging or crossing of individual multipath components within a group.

Figure 7:
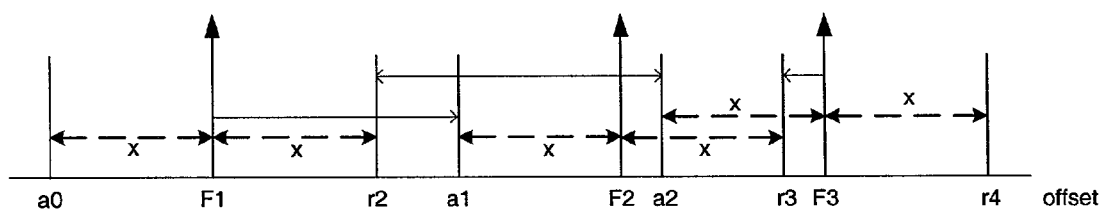
FIG. 7 is a graphical representation of the interrelationship between a plurality of fingers and their respective, dynamically updated, motion limits.

FIG. 7 depicts the relationship between finger offsets and motion limits in an exemplary dynamic motion limit procedure, such as that described with respect to FIG. 6. As in FIG. 4, this example uses three fingers, F1, F2, and F3. Advance limit a0 and retard limit r4 are shown, although no finger F0 or F4 is discussed. Those of skill in the art will recognize how to expand the principles described in this example to any number of fingers. In this example, the minimum distance between the finger position and either the advance limit of the finger behind or the retard limit of the finger ahead gives the minimum separation of two fingers. It may be convenient for the minimum separation to be equal for all the fingers and advance limits, but it is not necessary. For clarity of discussion, in this example, the minimum separations between fingers are identical and are labeled x in FIG. 7.

For example, F1 is surrounded by a0 and r2, both distance x away. Note that, in contrast to FIG. 4, the motion limits closest to F1 are not necessarily the motion limits of F1. F2 will only be able to retard until it reaches r2, thus the minimum separation is given by x. As F1 advances or retards, a0 and r2 will be advanced or retarded in concert. Although the test to allow F1 to advance or retard uses a1 and r1 (r1 is not shown), the dynamic updating procedure updates the adjacent motion limits, a0 and r2 in this case. Similarly, F2, is surrounded by a1 and r3. F1 cannot advance further than a1, which would result in F1 and F2 being separated by x. F3 cannot retard further than r3. In the example shown, F2 and F3 are close enough that a2 has been retarded past r3 (or r3 was advanced past a2). It can be readily seen that as the separation between F2 and F3 narrows, the motion will be limited when the separation is a distance given by x. This is because if F3 retards, so does a2, thus restricting the available advancing of F2. Similarly, as F2 advances, so does r3, thus restricting the available retarding of F3.

Figure 8:
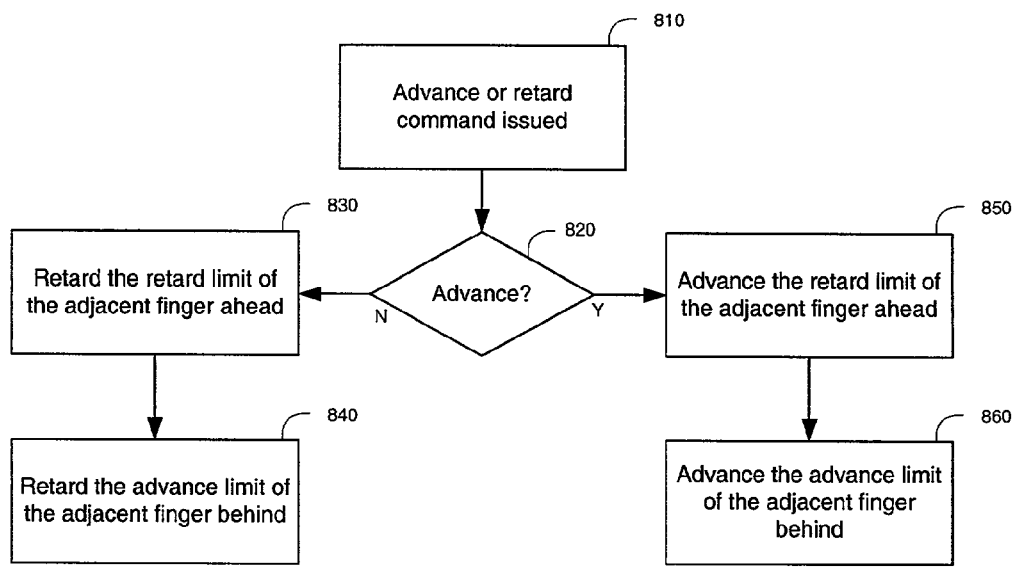
FIG. 8 is a flowchart of an embodiment of a method for dynamically updating motion limits, an example of which was depicted in FIG. 7.

FIG. 8 depicts a flowchart of a method for updating the dynamic motion limits as described with respect to FIG. 7. In step 810, an advance or retard command is issued, subject to the advance or retard motion limits of the current finger. In decision block 820, if the command was an advance, proceed to step 850. Advance the retard limit of the adjacent finger ahead and proceed to step 860. In step 860, advance the advance limit of the adjacent finger behind. If, in decision block 820, the command was a retard, proceed to step 830 and retard the retard limit of the adjacent finger ahead. Proceed to step 840 and retard the advance limit of the adjacent finger behind. After either step 840 or 860, the dynamic motion limit update procedure is complete for the current finger.

Figure 9:
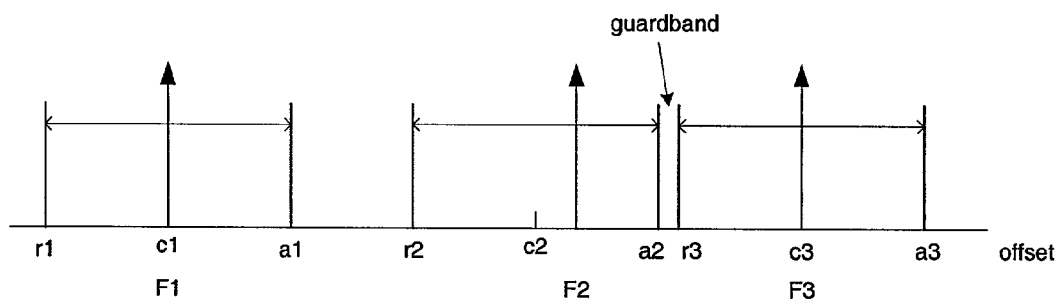
FIG. 9 is an alternate graphical representation of the interrelationship between a plurality of fingers and their respective, dynamically updated, motion limits.

FIG. 9 depicts the relationship between finger offsets and motion limits in an alternate exemplary dynamic motion limit procedure, such as step 620, described with respect to FIG. 6. This procedure can also be used in the method of FIG. 3, where step 330 is modified to allow updates of the motion limits before expiration. The procedure is described in more detail with respect to FIG. 10, below.

In FIG. 9, three fingers, F1–F3, are shown, with arrows corresponding to the offset currently being demodulated by each respective finger. As before, any number of fingers can be supported by the procedure of FIG. 10. Each finger has corresponding advance limits, a1–a3, and retard limits, r1–r3. A center point, labeled c1–c3, respectively, marks the center of the span of offsets within the motion limits of each finger. As a finger tracks, it updates its own motion limits, as well as the motion limits of a neighboring finger, under certain conditions, examples of which are given with respect to FIG. 10.

In FIG. 9, finger F1 is free to track in either direction, and can update its retard and advance motion limits (r1 and a1) without infringing on a neighboring finger. (Note that additional fingers could be included in this example to the left of F1 or to the right of F4. The principles described herein would extend to additional fingers as well). As such, the finger is located at the center point, c1, of the available offsets delineated by its motion limits. By contrast, F2 has advanced such that its advance motion limit, a2, is within the minimum guardband of the retard limit, r3, of the adjacent finger ahead, F3. The motion limits, r2 and a2, of finger F2, may have been advanced along with F2 until this minimum separation from F3 was reached. Then F2 advanced further, as can be seen by the location of F2 in relation to the center point, c2. F2 can continue to advance until a2 is reached, but the motion limits of F2 cannot be advanced until the retard limit, r3, of finger F3 advances away from a2. Alternatively, F2, may retard away from a2. Once F2 retards back to the center point, c2, the motion limits can be retarded along with retards of F2, until r2 comes within a minimum guardband of a1. Note that F3 is also at the center point, c3. If F3 were to be retarded, its motion limits would not be updated without a prior movement of the F2 motion limits. If F3 advances, its motion limits r3 and a3 can be advanced, as can the motion limits of F2.

These examples indicate how motion limits can be adapted to "breathe" with group wide movement of a plurality of fingers, while preventing finger merge due to individual finger movement within the group. This method, an exemplary embodiment of which is detailed in FIG. 10, can be used to update dynamic motion limits during every advance or retard of every finger in a plurality of fingers. It can also be used at a frequency lower than the rate of time-tracking command generation. If the computational overhead of performing the method is relatively high, it can be reduced by updating the motion limits at boundaries indicated by a pre-determined time duration, multiples of time-tracking commands, or the like. In the limit, such a procedure approaches the static motion limit procedure described in FIG. 3. The relative frequency of motion limit update with respect to time-tracking command generation, width of motion afforded to each finger (as given by the advance and retard spacing with respect to the center), minimum guardband, and the like can be variable and need not be identical across each of the plurality of fingers. Those of skill in the art will recognize myriad combinations, which can be deployed within the scope of the present invention.

Figure 10:
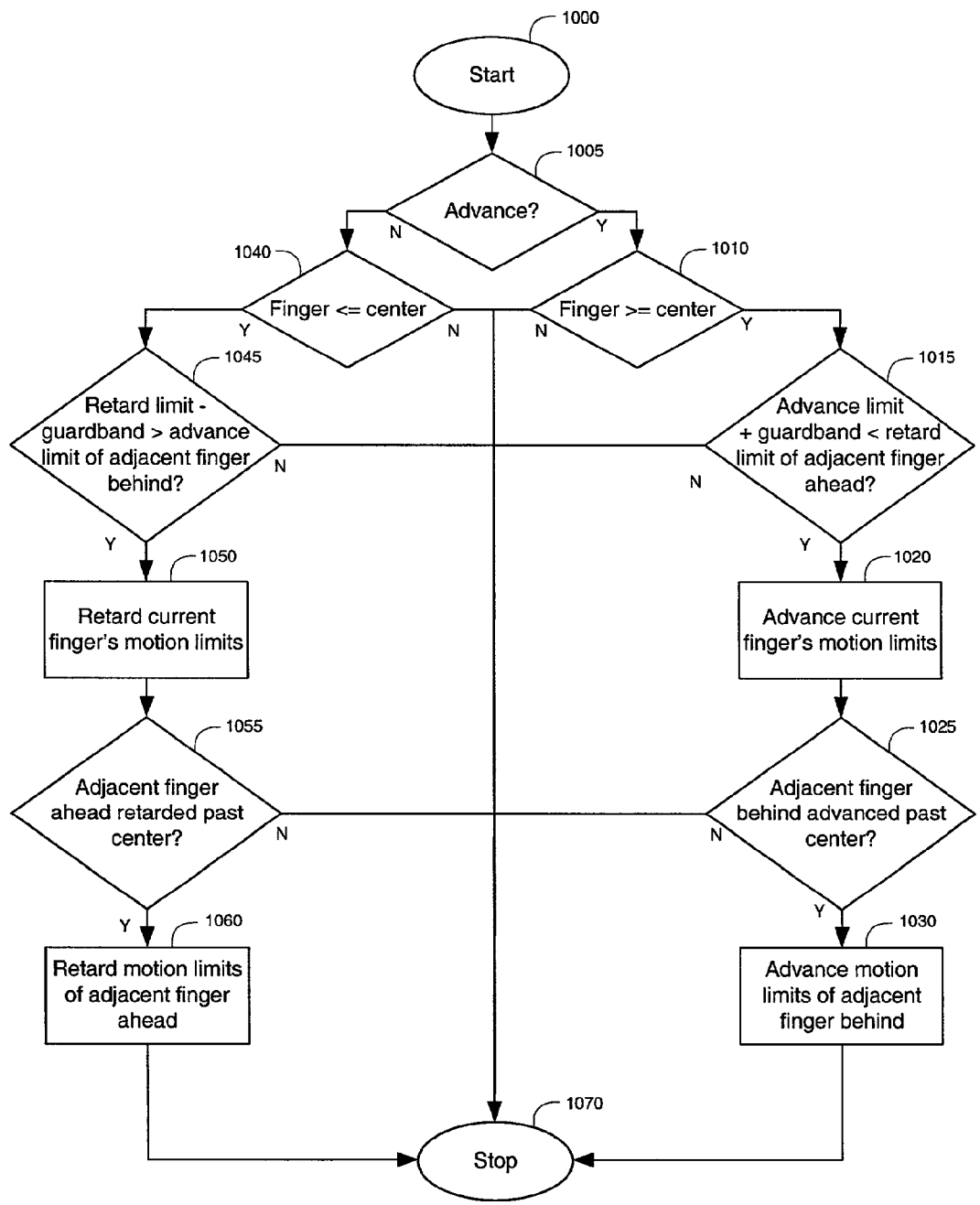
FIG. 10 is a flowchart of an embodiment of a method for dynamically updating motion limits, an example of which was depicted in FIG. 9.

The possible motion of fingers and motion limit updates described with respect to FIG. 9 can be governed by a motion limit update procedure, an example of which is given in flowchart form in FIG. 10. As just discussed, the frequency with which update procedure is called can be as often as every time-tracking command, or at any rate lower (calling the procedure with greater frequency is not harmful; neither is it productive). The process begins at start block 1000, subsequent to a time-tracking command. The finger receiving the time-tracking command is referred to as the current finger, and it may have an adjacent finger ahead as well as one behind. As described above with respect to FIGS. 3 and 6, the time-tracking command should result in a finger position within the motion limits to be valid.

Proceed to decision block 1005, where, if the command is an advance, proceed to decision block 1010. In decision block 1010, if the finger position is advanced past the center point, the motion limits have previously advanced as far as currently possible. This is the condition in which an advance of motion limits would be most desirable, although the position of the adjacent finger ahead must have advanced in the interim to make an advance possible. (Retarding the motion limits would merely exacerbate the condition of the finger nearing its advance limit.) Referring to FIG. 9, finger F2 is in such a position. If the finger is in the center, the finger's motion limits may be at the boundary of movement with respect to a neighboring finger, or may have additional room to move. F3 is an example of a finger, centered within its motion limits, with no room for a motion limit retard—an advance of the motion limits is acceptable. F1 is an example of a centered finger, which can advance or retard its motion limits. In the case where the finger is advanced past the center when an advance command is given, proceed to decision block 1015 to determine if a motion limit advance for the current finger is possible.

When the finger is not centered or advanced past the center, it has retarded from the center point. An advance of such a finger is desirable to increase the space between the finger and its limits. Advancing the limits (which would include the relatively nearer retard limit) may not be desirable. In this case, proceed from decision block 1010 to stop block 1070 and terminate the motion limit update procedure without adjusting any motion limits.

In decision block 1015, determine if the motion limits around the centered or advanced finger can be advanced to either keep the finger centered subsequent to the advance or to minimize the distance between the finger and the advance limit. To do so, the advance limit of the finger, plus any guardband, must be less than the retard limit of the adjacent finger ahead. If this is so, then a motion limit advance is available. Proceed to block 1020 and advance the current finger's motion limits. If the condition in block 1015 is not met, although a motion limit advance may be desirable, it is not presently available. Proceed to stop block 1070.

Once step 1020 has transpired, that is, the motion limits of the current finger have been advanced, there may have been space created to advance the motion limits of the finger behind. This can be determined, as shown in decision block 1025, by testing if the adjacent finger behind is advanced past its center. If so, then advancing the motion limits will ease the distance from the finger to its advance limit. If the adjacent finger behind is centered, no adjustment is necessary. If the adjacent finger behind is retarded past the center, it may be undesirable to exacerbate the relatively smaller distance between that finger and its retard limit, which would occur if those motion limits were advanced. If, in decision block 1025, the adjacent finger behind is not determined to benefit from a motion limit advance, proceed to stop block 1070. If an advance is desirable, proceed to step 1030 and advance the motion limits of the adjacent finger behind. Then proceed to stop block 1070 to terminate the procedure.

The foregoing description of steps 1010–1030 applied when the time-tracking command was an advance, as determined in decision block 1005. When the time-tracking command is a retard, a similar procedure to steps 1010–1030 is carried out in steps 1040–1060, with the modifications described below. When, in decision block 1005, the time-tracking command is a retard command, proceed to decision block 1040.

In decision block 1040, the finger will benefit from a retard of its motion limits if it has retarded past its center, thus reducing the space between it and its retard limit. Referring to FIG. 9, F2 is an example of a finger that would not meet this test. A retard issued to F2 will move it closer to its center. Subsequently retarding its motion limits will move the center back away from F2. Finger F1 is an example of a finger that could benefit from a retard of its motion limits subsequent to a retard of F1 through a time-tracking command. If F2, was centered, or at a position less than c2, it would also be a candidate for retarding its motion limits. If the current finger should not have its motion limits retarded, proceed to stop block 1070. If the current finger should have its motion limits retarded, proceed to block 105 to do so. Then proceed to decision block 1055 to determine if an adjacent finger would benefit from a motion limit retard.

In decision block 1055, if the adjacent finger ahead is retarded past its center, then the motion limits of the adjacent finger ahead can be retarded subsequent to the retard of the current finger's motion limits. If this is the case, proceed to block 1060. If not, proceed to stop block 1070. In block 1060, retard the motion limits of the adjacent finger ahead. Then proceed to block 1070 to terminate the procedure.

Note that the procedure of FIG. 10, with some modification, can be called without a preceding time-tracking command. This can be useful when the motion limits are updated at a lesser frequency. One such modification can be carried out by replacing decision blocks 1005, 1010 and 1040 with the following steps (not shown). First, test to see if the finger is centered. If so, then the motion limits for the current finger should not be updated. Proceed to stop block 1070. If the finger is not centered, then the motion limits may be able to breathe in one direction or another. If the finger is retarded from the center, follow the path beginning in decision block 1045. If the finger is advanced from the center, follow the path from decision block 1015. Various modifications of these embodiments are anticipated and fall within the scope of the principles enlightened by FIGS. 9–10 and the accompanying description. Examples include adjusting neighboring motion limits when a current finger is centered and moving limits by multiples of the minimum advance or retard increment.

Various embodiments may alter the order in which the procedure is called for the various fingers within a plurality. One example is to start with the smallest offset and proceed to each adjacent finger ahead. Another may be to start at the greatest offset and proceed to each adjacent finger behind. (In both these examples, those of skill in the art will recognize how to account for modifications of "smallest" and "greatest" to account for the fact that the PN space is circular, thus a small offset may be slightly "advanced" with respect to an offset with a nominally large number that is near the end of the PN sequence.) Yet another may be to begin in the middle, and so forth.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of time-tracking a plurality of fingers, each finger having an advance limit, a retard limit, and a center position located approximately equidistant from the finger's advance and retard limits, comprising:

advancing the advance and retard limits of a first finger when the first finger is advanced past the center position and the advance limit of the first finger plus a pre-determined guardband is less than the retard limit of a second finger ahead of and adjacent to the first finger; and retarding the advance and retard limits of the first finger when the first finger is retarded past the center position and the retard limit of the first finger minus a pre-determined guardband is greater than the advance limit of a third finger behind and adjacent to the first finger.

2. The method of claim 1, further comprising advancing the advance and retard limits of the third finger, subsequent to an advance of the advance and retard limits of the first finger, when the third finger is advanced past its center position.

3. The method of claim 1, further comprising retarding the advance and retard limits of the second finger, subsequent to a retard of the advance and retard limits of the first finger, when the second finger is retarded past its center position.

4. The method of claim 1, wherein the advance and retard limits of the firs finger are advanced subsequent to an advance command to the first finger.

5. The method of claim 1, wherein the advance and retard limits of the first finger are retarded subsequent to a retard command to the first finger.

6. Processor readable media operable to perform a method of time-tracking a plurality of fingers, each finger having an advance and a retard limit, the method comprising the following steps:

advancing the advance and retard limits of a first finger when the first finger is advanced past its center position and the advance limit of the first finger plus a pre-determined guardband is less than the retard limit of a second finger ahead of and adjacent to the first finger; and retarding the advance and retard limits of a first finger when the first finger is retarded past its center position and the retard limit of the first finger minus a pre-determined guardband is greater than the advance limit of a third finger behind and adjacent to the first finger.

7. A Rake receiver comprising:

a plurality of fingers having advance and retard limits;

means for advancing the advance and retard limits of a first finger when the first finger is advanced past its center position and the advance limit of the first finger plus a pre-determined guardband is less than the retard limit of a second finger ahead of and adjacent to the first finger; and means for retarding the advance and retard limits of a first finger when the first finger is retarded past its center position and the retard limit of the first finger minus a pre-determined guardband is greater than the advance limit of a third finger behind and adjacent to the first finger.

* * * * *